United States Patent
Choi et al.

(10) Patent No.: US 9,503,172 B2
(45) Date of Patent: Nov. 22, 2016

(54) METHOD FOR DUAL MODE BEAMFORMING AND APPARATUS FOR THE SAME

(71) Applicant: INDUSTRY-ACADEMIC COOPERATION FOUNDATION, YEUNGNAM UNIVERSITY, Gyeongsan-si, Gyeongsangbuk-do (KR)

(72) Inventors: Kwon Hue Choi, Gyeongsan-si (KR); Jin Hui Lee, Gyeongsan-si (KR); Amini Sahar, Gyeongsan-si (KR)

(73) Assignee: INDUSTRY-ACADEMIC COOPERATION FOUNDATION, YEUNGNAM UNIVERSITY, Gyeongsan-si, Gyeongsangbuk-do (KR)

( * ) Notice: Subject to any disclaimer, the term of this patent is extended or adjusted under 35 U.S.C. 154(b) by 0 days.

(21) Appl. No.: 14/932,198

(22) Filed: Nov. 4, 2015

(65) Prior Publication Data
US 2016/0277086 A1    Sep. 22, 2016

(30) Foreign Application Priority Data
Oct. 16, 2014  (KR) .......... 10-2014-0140080

(51) Int. Cl.
H04B 7/06    (2006.01)

(52) U.S. Cl.
CPC .................. *H04B 7/0617* (2013.01)

(58) Field of Classification Search
CPC ......... H04B 7/0617; H04B 7/04; H04L 1/06; H04L 1/04; H04L 1/0618; H04L 25/0204
USPC .......... 375/260, 267, 299, 347–349
See application file for complete search history.

(56) References Cited

U.S. PATENT DOCUMENTS 6,545,639 B1 *  4/2003  Barnard .................. G01S 3/14
                                                  342/378
7,117,014 B1 * 10/2006  Van Rensburg ..... H04B 7/0695
                                                  342/377
(Continued)

FOREIGN PATENT DOCUMENTS

| KR | 1020080087211 A | 10/2008 |
| KR | 1020120011952 A | 2/2012 |
| KR | 1020120092278 A | 8/2012 |

OTHER PUBLICATIONS

Sahar Amini, et al; "Performance Comparison between Distributed Beamforming and Clustered Beamforming", IEEE 2014 11th International Conference on Information Technology: New Generations (ITNG) Apr. 7-9, 2014; pp. 174-179.

*Primary Examiner* — Emmanuel Bayard
(74) *Attorney, Agent, or Firm* — Ladas & Parry LLP

(57) ABSTRACT

Disclosed are dual mode beamforming methods and apparatuses for the same. An exemplary embodiment of the dual mode beamforming method may comprise obtaining a boundary equation generated based on mean channel gains (MCGs) and spatial correlation coefficients (SCCs) for a plurality of antennas of a plurality of base station; obtaining, from the plurality of base stations, MCGs of respective antennas equipped in each of the plurality of base stations and a SCC of a plurality of antennas equipped in at least one base station of the plurality of base stations; and determining a beamforming mode based on the boundary equation, the MCGs and SCCs obtained from the plurality of base stations. Therefore, a co-located beamforming or a distributed beamforming can be performed selectively according to a radio communication environment.

12 Claims, 18 Drawing Sheets

(56) References Cited

U.S. PATENT DOCUMENTS

| | | | | |
|---|---|---|---|---|
| 7,676,007 B1* | 3/2010 | Choi | H04B 7/0617 | 375/267 |
| 7,839,810 B2* | 11/2010 | Zhang | H04B 7/043 | 370/310 |
| 7,907,913 B2* | 3/2011 | Lee | H04B 7/0417 | 455/69 |
| 8,295,383 B2* | 10/2012 | Yoshida | H04B 1/71052 | 375/267 |
| 8,315,323 B2* | 11/2012 | Liu | H04B 7/0639 | 375/260 |
| 8,345,795 B1* | 1/2013 | Lee | H04B 7/0417 | 375/259 |
| 8,364,091 B2* | 1/2013 | Ko | H04B 7/0617 | 370/252 |
| 8,675,627 B2* | 3/2014 | Xia | H04B 7/0626 | 370/310 |
| 8,693,568 B2* | 4/2014 | Lee | H04L 25/0208 | 375/260 |
| 8,743,995 B2* | 6/2014 | Tse | H04B 7/0413 | 375/267 |
| 8,744,373 B2* | 6/2014 | Pourseyed | H01Q 3/24 | 455/101 |
| 8,750,401 B2* | 6/2014 | Kyeong | H04B 7/0408 | 375/267 |
| 8,767,701 B2* | 7/2014 | Howard | H04B 7/0417 | 370/343 |
| 8,818,440 B2* | 8/2014 | Ko | H04B 7/0617 | 455/13.4 |
| 8,929,244 B2* | 1/2015 | Lee | H04B 7/0695 | 370/252 |
| 8,965,003 B2* | 2/2015 | Rasmussen | H04R 3/005 | 381/92 |
| 9,088,389 B2* | 7/2015 | Gorokhov | H04B 1/7075 | |
| 9,088,944 B2* | 7/2015 | Byun | H04B 7/0452 | |
| 9,185,577 B2* | 11/2015 | Tomeba | H04B 7/0452 | |
| 9,240,871 B2* | 1/2016 | Walton | H04B 7/022 | |
| 9,253,592 B1* | 2/2016 | Moscovich | H04W 4/008 | |
| 9,262,912 B2* | 2/2016 | Wild | G01S 13/756 | |
| 9,344,163 B2* | 5/2016 | Han | H04B 7/0413 | |
| 2004/0235433 A1* | 11/2004 | Hugl | H04B 7/0608 | 455/101 |
| 2005/0286650 A1* | 12/2005 | Han | H04B 7/0417 | 375/267 |
| 2006/0176993 A1* | 8/2006 | Kwun | H04B 7/0417 | 375/367 |
| 2007/0217433 A1* | 9/2007 | Doppler | H04B 7/02 | 370/400 |
| 2008/0181174 A1* | 7/2008 | Cho | H04B 7/0857 | 370/329 |
| 2008/0316935 A1* | 12/2008 | Bala | H04B 7/0408 | 370/252 |
| 2009/0080558 A1* | 3/2009 | An | H04L 1/0625 | 375/267 |
| 2011/0080264 A1* | 4/2011 | Clare | G01S 13/82 | 340/10.1 |
| 2013/0113657 A1* | 5/2013 | Behbahani | H01Q 25/00 | 342/373 |
| 2013/0163544 A1* | 6/2013 | Lee | H04W 72/04 | 370/329 |
| 2013/0229307 A1* | 9/2013 | Chang | H01Q 3/34 | 342/372 |
| 2013/0229935 A1* | 9/2013 | Gorokhov | H04L 5/0023 | 370/252 |
| 2014/0314006 A1* | 10/2014 | Suh | H04B 7/0452 | 370/329 |
| 2015/0022402 A1* | 1/2015 | Gavilan | H01Q 1/243 | 343/702 |
| 2015/0280793 A1* | 10/2015 | Byun | H04B 7/0452 | 375/260 |
| 2015/0280802 A1* | 10/2015 | Thomas | H04L 27/2636 | 370/312 |
| 2015/0365143 A1* | 12/2015 | Chai | H04B 17/104 | 455/101 |
| 2016/0105817 A1* | 4/2016 | Frenne | H04L 5/00 | 370/252 |
| 2016/0149679 A1* | 5/2016 | Frenne | H04L 5/0048 | 370/329 |

\* cited by examiner

METHOD FOR DUAL MODE BEAMFORMING AND APPARATUS FOR THE SAME

CROSS-REFERENCE TO RELATED APPLICATIONS

This application claims priority to Korean Patent Application No. 10-2014-0140080 filed on Oct. 16, 2014 in the Korean Intellectual Property Office (KIPO), the entire contents of which are hereby incorporated by reference.

BACKGROUND

1. Technical Field

The present disclosure relates to a wireless communication technology, and more particularly, to methods for beamforming in a wireless communication system and apparatuses for the same.

2. Related Art

A multi-antenna technology may mean a signal processing technology using a plurality of antennas in at least one of a transmitter and a receiver. The multi-antenna technology may be used for not only provision of better services (e.g., higher data rate per user) but also provision of enhanced system capacity (e.g., more users per cell) and enhanced system coverage.

The multi-antenna technology may include a diversity, a beamforming, a spatial multiplexing (i.e., multiple input multiple output (MIMO)), etc. In the case of diversity, multiple antennas in at least one of the transmitter and the receiver may further provide diversity effects in addition to fading on radio channels. For this, the multiple antennas should have low mutual correlations with each other.

In the case of beamforming, multiple antennas in at least one of the transmitter and the receiver may generate a beam to maximize antenna gain for a specific direction or suppress interference signals between beams. For this, each of the multiple antennas may operate based on high mutual fading correlations or low mutual fading correlations. In the case of spatial multiplexing, both of the transmitter and the receiver may generate a plurality of communication channels on a wireless interface. For this, higher data rate can be provided in a restricted bandwidth without a significant reduction of coverage.

Meanwhile, the beamforming may be classified into a co-located beamforming (CBF), a distributed beamforming (DBF), etc. In the CBF, a single base station performs beamforming by using a plurality of antennas. In the DBF, a plurality of base stations perform beamforming by using at least one antenna, respectively.

According to wireless communication environments, CBF may have a better performance as compared to DBF, or DBF may have a better performance as compared to CBF. Therefore, it is required to perform CBF or DBF selectively according to wireless communication environments.

SUMMARY

Accordingly, exemplary embodiments of the present invention are provided to substantially obviate one or more problems due to limitations and disadvantages of the related art.

Exemplary embodiments of the present invention provide dual mode beamforming methods for selectively performing CBF or DBF according to a given wireless communication environment.

Exemplary embodiments of the present invention provide dual mode beamforming apparatuses for selectively performing CBF or DBF according to a given wireless communication environment.

In order to achieve the objectives of the present invention, a dual mode beamforming method performed in a terminal, the method comprises obtaining a boundary equation generated based on mean channel gains (MCGs) and spatial correlation coefficients (SCCs) for a plurality of antennas of a plurality of base stations; obtaining, from the plurality of base stations, MCGs of respective antennas equipped in each of the plurality of base stations and a SCC of a plurality of antennas equipped in at least one base station of the plurality of base stations; and determining a beamforming mode based on the boundary equation, the MCGs and SCCs obtained from the plurality of base stations.

Here, the boundary equation may represent a region in which a co-located beamforming (CBF) is preferred and a region in which a distributed beamforming (DBF) is preferred.

Here, the beamforming mode may be determined to be a CBF when a region indicated by the obtained MCGs and SCCs is a region in which the CBF is preferred among regions represented by the boundary equation.

Here, the beamforming mode may be determined to be a DBF when a region indicated by the obtained MCGs and SCCs is a region in which the DFB is preferred among regions represented by the boundary equation.

Here, a SCC used for generating the boundary equation may be a SCC according to an exponential correlation model or a SCC according to a constant correlation model.

Here, the plurality of base stations may exist in communicatable positions with the terminal.

In order to achieve the objectives of the present invention, a terminal apparatus performing communications, the terminal apparatus comprises a processor and a memory storing at least one program command executed by the processor, wherein the at least one program command executes obtaining a boundary equation generated based on mean channel gains (MCGs) and spatial correlation coefficients (SCCs) for a plurality of antennas of a plurality of base stations; obtaining, from the plurality of base stations, MCGs of respective antennas equipped in each of the plurality of base stations and a SCC of a plurality of antennas equipped in at least one base station of the plurality of base stations; and determining a beamforming mode based on the boundary equation, the MCGs and SCCs obtained from the plurality of base stations.

Here, the boundary equation may represent a region in which a co-located beamforming (CBF) is preferred and a region in which a distributed beamforming (DBF) is preferred.

Here, the beamforming mode may be determined to be a CBF when a region indicated by the obtained MCGs and SCCs is a region in which the CBF is preferred among regions represented by the boundary equation.

Here, the beamforming mode may be determined to be a CBF when a region indicated by the obtained MCGs and SCCs is a region in which the CBF is preferred among regions represented by the boundary equation.

Here, a SCC used for generating the boundary equation may be a SCC according to an exponential correlation model or a SCC according to a constant correlation model.

Here, the plurality of base stations may exist in communicatable positions with the terminal.

According to exemplary embodiments of the present disclosure, CBF or DBF can be performed selectively according to a wireless communication environment. Through this, a performance of a wireless communication system may be enhanced.

BRIEF DESCRIPTION OF DRAWINGS

Exemplary embodiments of the present invention will become more apparent by describing in detail exemplary embodiments of the present invention with reference to the accompanying drawings, in which.

DETAILED DESCRIPTION

Figure 1:
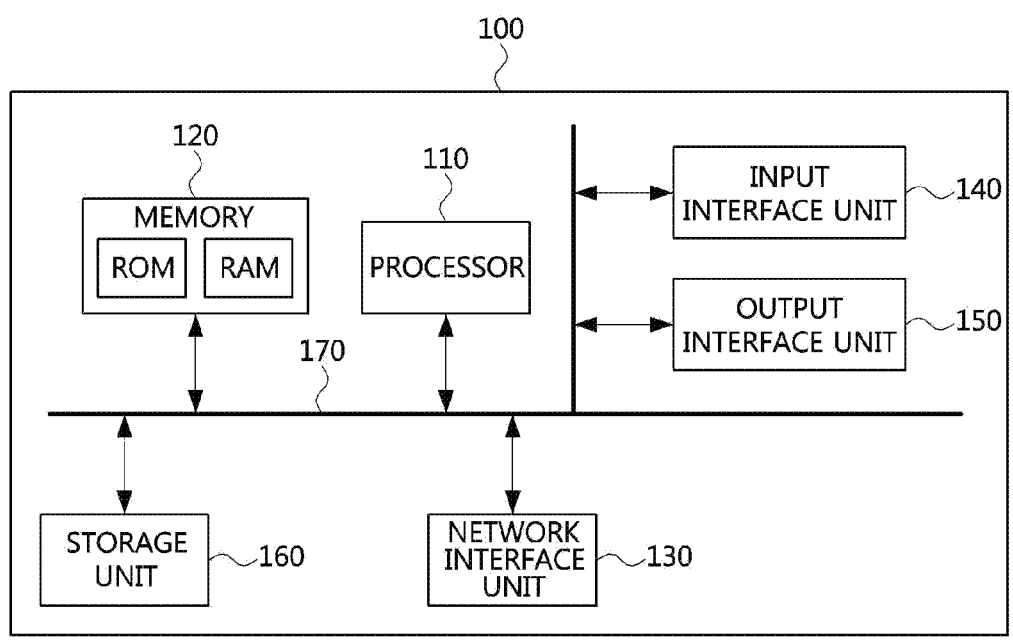
FIG. 1 is a block diagram illustrating an exemplary embodiment of a terminal performing methods according to the present disclosure.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" with another element, it can be directly connected or coupled with the other element or intervening elements may be present. In contrast, when an element is referred to as being "directly connected" or "directly coupled" with another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the appended drawings. In the following description, for easy understanding, like numbers refer to like elements throughout the description of the figures, and the same elements will not be described further.

In the entire specification, the term "network" used in this specification may include a mobile internet such as a Wireless Fidelity (WIFI), a Wireless Broadband Internet (WiBro), and a World Interoperability for Microwave Access (WiMax). Also, it may include a 2G cellular network such as a Global System for Mobile communication (GSM) and a Code Division Multiple Access (CDMA), a 3G cellular network such as a Wideband Code Division Multiple Access (WCDMA) and a CDMA2000. Also, it may include a 3.5G cellular network such as a High Speed Downlink Packet Access (HSDPA) and a High Speed Uplink Packet Access (HSDPA). Also, it may include a 4G or beyond 4G cellular network such as a Long Term Evolution (LTE) and a LTE-Advanced.

In the entire specification, the term "terminal" used in this specification may be referred to as User Equipment (UE), a User Terminal (UT), a wireless terminal, an Access Terminal (AT), a Subscriber Unit (SU), a Subscriber Station (SS), a wireless device, a wireless communication device, a Wireless Transmit/Receive Unit (WTRU), a mobile node, a mobile, or other words. The terminal may be a cellular phone, a smart phone having a wireless communication function, a Personal Digital Assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, or also a portable unit or terminal having a combination of such functions. However, the terminal is not limited to the above-mentioned units.

In the entire specification, the term "base station" used in this specification means a fixed point that communicates with terminals, and may be referred to as another word, such as Node-B, eNode-B, a base transceiver system (BTS), an access point, etc. Also, the term "base station" means a controlling apparatus which controls at least one cell. In a real wireless communication system, a base station may be connected to and controls a plurality of cells physically, in this case, the base station may be regarded to comprise a plurality of logical base stations. That is, parameters configured to each cell are assigned by the corresponding base station.

FIG. 1 is a block diagram illustrating an exemplary embodiment of a terminal performing methods according to the present disclosure.

Referring to FIG. 1, a terminal 100 may include at least one processor 110, a memory 120, and a network interface unit 130. Also, the terminal 100 may further include an input interface unit 140, an output interface unit 150, a storage unit 160, etc. The entities included in the terminal 100 may be connected to a bus 170 and communicate with each other via the bus 170.

The processor 110 may execute a program code stored in the memory 120 and/or the storage unit 160. Here, the processor 110 may be a central processing unit (CPU), a graphic processing unit (GPU), or a dedicated processor for executing methods according to the present disclosure. The memory 120 and the storage unit 160 may be constructed using a volatile memory device and/or a non-volatile memory device. For example, the memory 120 may include a read-only memory (ROM) and/or a random access memory (RAM).

A transmit (TX) beamforming may be classified into a co-located beamforming (CBF), a distributed beamforming (DBF), etc. A plurality of antennas which perform beamforming in the CBF manner may be located in a single transmitter. On the contrary, each of a plurality of antennas which perform beamforming in the DBF manner may be located in a different transmitter. Through the DBF, a problem of spatial correlation in the CBF may be resolved. Here, the transmitter may be an entity included in a base station or a terminal.

In a CBF-based cellular communication system, among a plurality of base stations or coordinated multi-points (CoMP), a terminal may connect to a single base station having a maximum mean channel gain (MCG) of a plurality of distributed antenna units (DAUB). In spite of the maximum MCG, signals received at the terminal may be deteriorated according to spatial correlation between multiple antennas. That is, as a spatial correlation coefficient (SCC) in the CBF increases, a performance of the CBF may decrease.

On the contrary, in a DBF-based cellular communication system, a terminal may connect to a plurality of base stations, and perform communications through antennas equipped in each of the plurality of base stations. In this case, a SCC between antennas of the plurality base stations connected with the terminal may become nearly 0, and a total transmit power for the terminal may be distributed over the plurality of base stations. Meanwhile, in the CBF-based cellular communication system, MCGs of other base stations which do not perform the CBF among the plurality of base stations may be smaller than the MCG of the base station performing the CBF with the terminal. Since a difference between MCGs of the plurality of base stations may increase as the terminal is more close to a specific base station among the plurality of base stations, a performance of DBF may decrease according to the increase of the difference between MCGs of the plurality of base stations. Therefore, a beamforming mode change may depend upon the difference between MCGs (i.e., a MCG ratio) in the DBF and a SCC in the CBF.

Hereinafter, a system model in which methods according to the present disclosure are performed will be explained.

For beamforming, each of a plurality of antennas used for beamforming may be shared by a plurality of terminals. Signals for respective terminals of the plurality of terminals may be multiplexed not in a spatial domain through such a multi user multiple input multiple output (MU-MIMO) but in a time/frequency or code domain through an orthogonal frequency division multiple access (OFDMA) or a code division multiple access (CDMA). That is, the beamforming may have an objective of not spatial multiplexing but spatial diversity.

Figure 2:
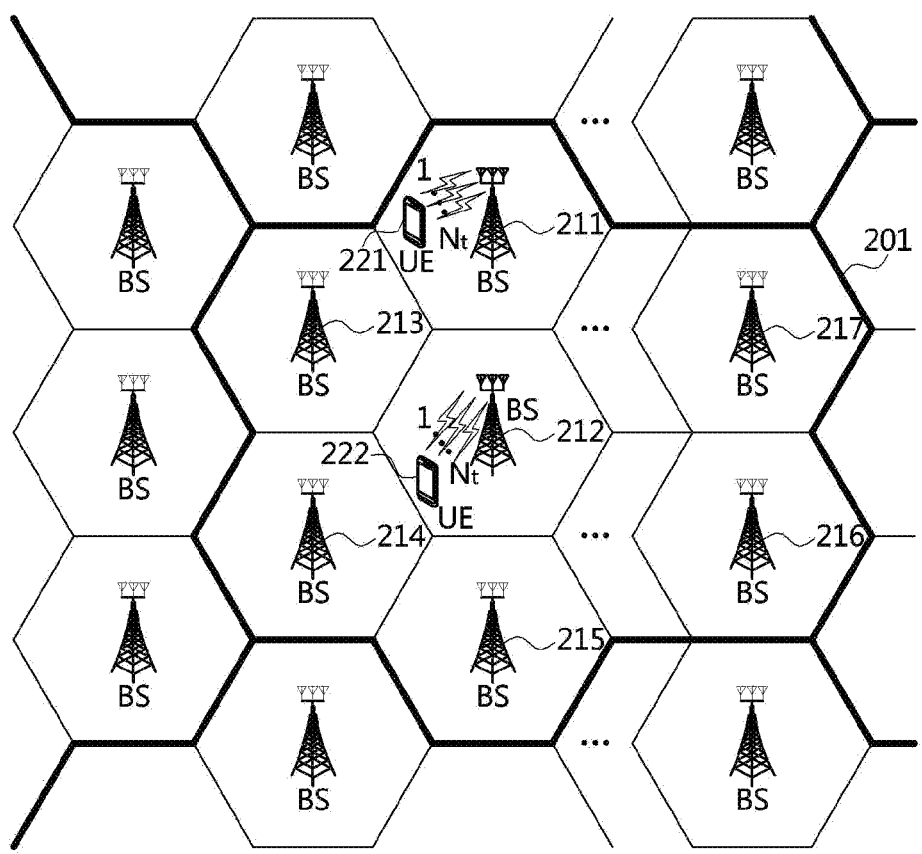
FIG. 2 is a conceptual diagram illustrating an exemplary embodiment of a CBF-based cellular communication system.
Figure 3:
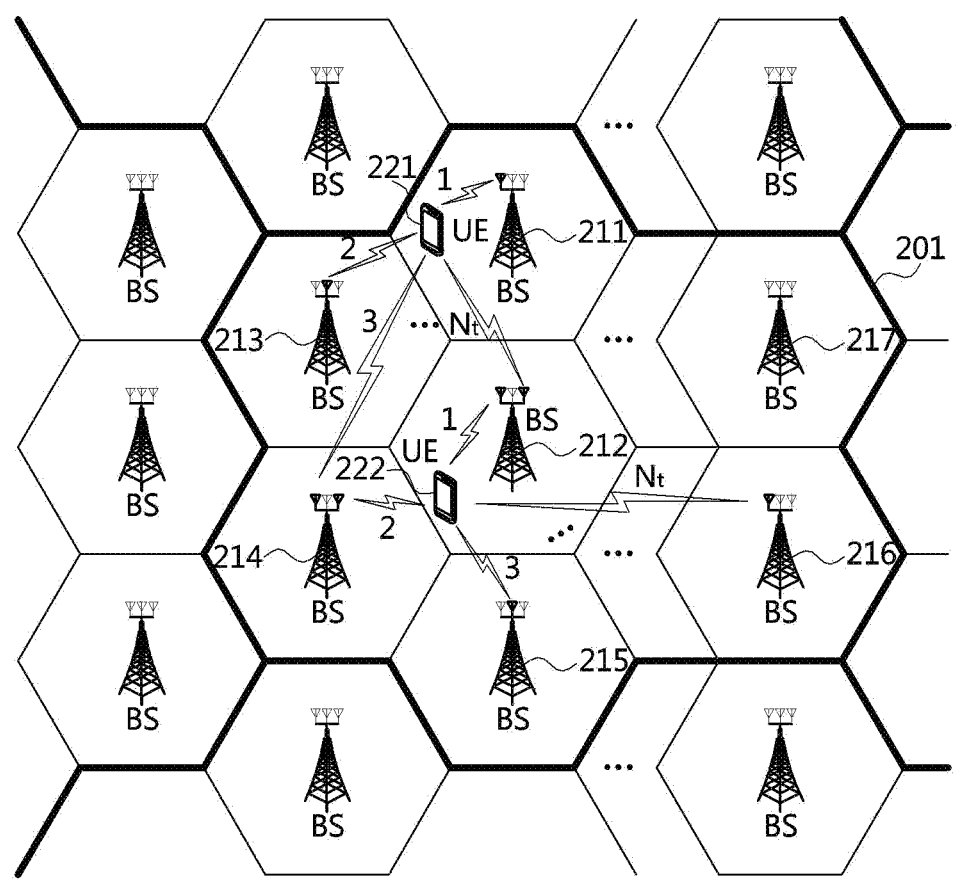
FIG. 3 is a conceptual diagram illustrating an exemplary embodiment of a DBF-based cellular communication system.

FIG. 2 is a conceptual diagram illustrating an exemplary embodiment of a CBF-based cellular communication system, and FIG. 3 is a conceptual diagram illustrating an exemplary embodiment of a DBF-based cellular communication system.

Referring to FIG. 2 and FIG. 3, a cluster may include a plurality of cells. For example, a first cluster 201 may include a cell served by a first base station 211, a cell served by a second base station 212, a cell served by a third base station 213, a cell served by a fourth base station 214, a cell served by a fifth base station 215, a cell served by a sixth base station 216, and a cell served by a seventh base station 217. Here, a single cluster may include $N_c$ cells, and the $N_c$ may be larger than the number of antennas ($N_t$) equipped in a base station constituting the cluster.

In the CBF-based cellular communication system, a first terminal 221 may be connected to the first base station 211, and $N_t$ antennas equipped in the first base station 211 may be activated for beamforming to the first terminal 221. Also, a second terminal 222 may be connected to the second base station 212, and $N_t$ antennas equipped in the second base station 212 may be activated for beamforming to the second terminal 222.

In the DBF-based cellular communication system, the first terminal 221 may be connected to the first base station 211, the second base station 212, the third base station 213, and the fourth base station 214. Also, antennas equipped in each of the base stations 211, 212, 213, and 214 may be activated for beamforming to the first terminal 221. Also, the second terminal 222 may be connected to the second base station 212, the fourth base station 214, the fifth base station 215, and the sixth base station 216. Also, antennas equipped in each of the base stations 212, 214, 215, and 216 may be activated for beamforming to the second terminal 222.

Here, a MCG for a specific terminal in a l-th base station may be defined as $g_l$. In a general case without loss, $g_l$ may defined as $g_l=\max[g_1, g_2, g_3, \ldots]$. For a fair infra basis of base stations, positions of base stations and structures of multiple antennas equipped in each of base stations may be identical for the CBF-based cellular communication system and the DBF-based cellular communication system. Also, for a fair spectrum resource allocation between terminals, the number of antennas ($N_t$) used for beamforming may be identical for the CBF-based cellular communication system and the DBF-based cellular communication system. In the DBF-based cellular communication system, an antenna having the largest MCG among $N_t$ antennas equipped in each base station may be used for beamforming.

Figure 4:
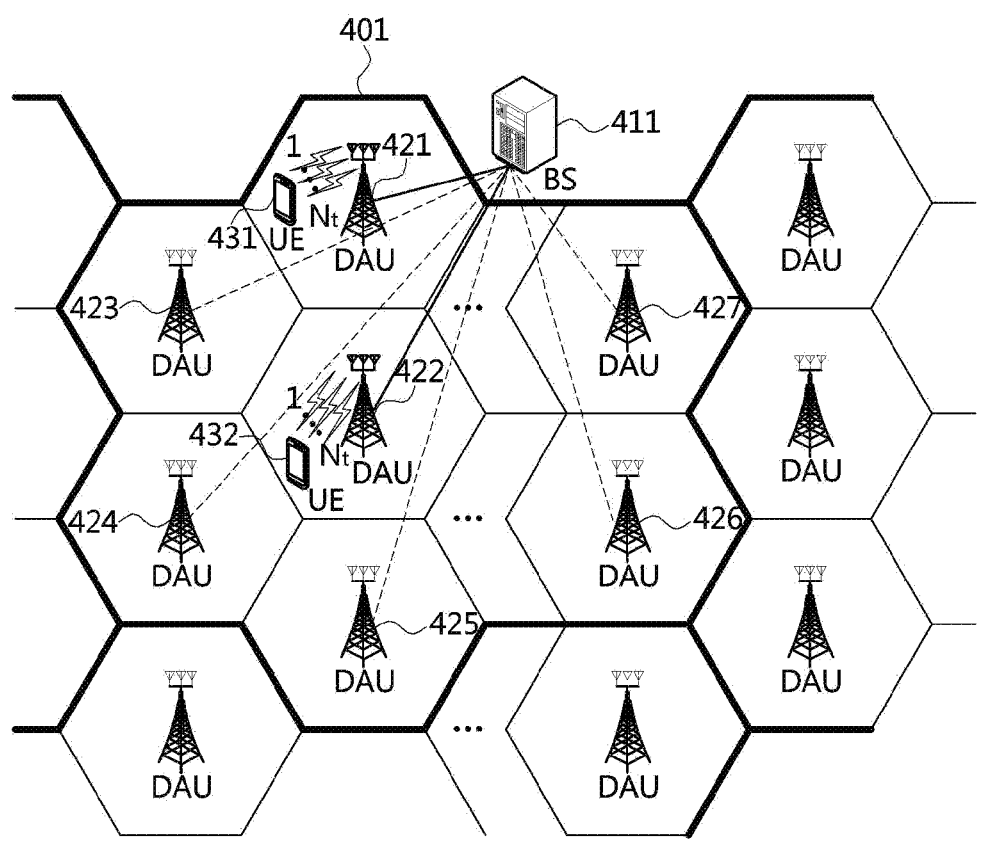
FIG. 4 is a conceptual diagram illustrating another exemplary embodiment of a CBF-based cellular communication system.
Figure 5:
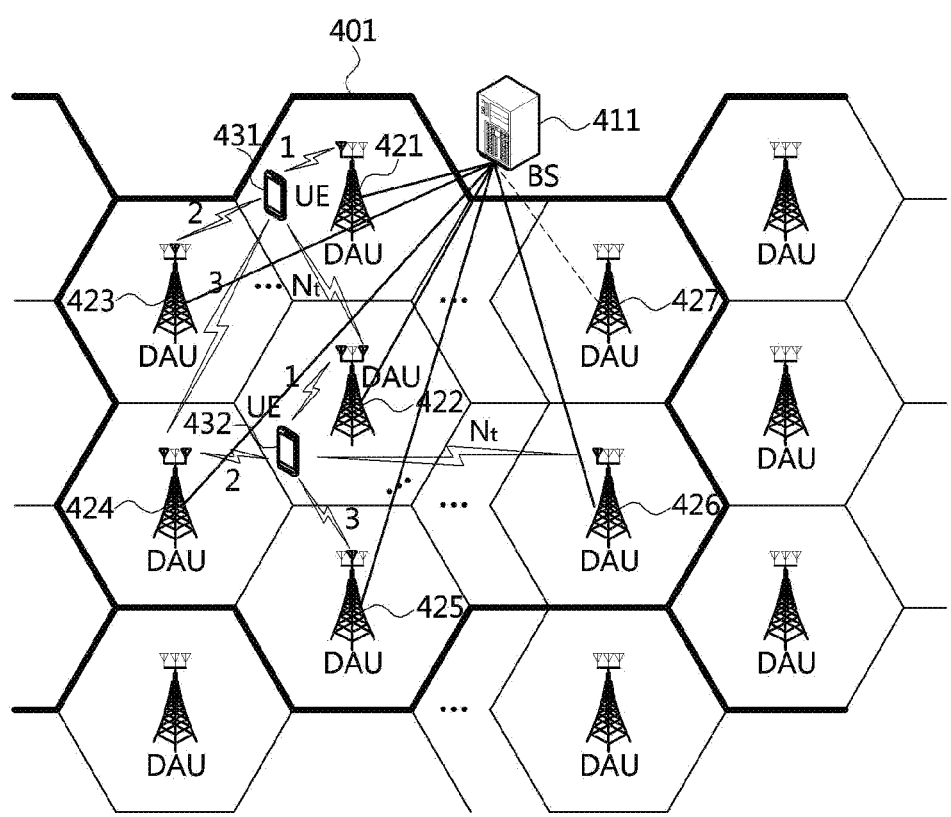
FIG. 5 is a conceptual diagram illustrating another exemplary embodiment of a DBF-based cellular communication system.

FIG. 4 is a conceptual diagram illustrating another exemplary embodiment of a CBF-based cellular communication system, and FIG. 5 is a conceptual diagram illustrating another exemplary embodiment of a DBF-based cellular communication system.

Referring to FIG. 4 and FIG. 5, a cluster including a plurality of cells may be managed by a single base station, and a cell may be managed by a distributed antenna unit (DAU) connected to the base station. For example, a first base station 411 may manage a first cluster 401, and each of a plurality of DAUs 421, 422, 423, 424, 425, 426, and 427 connected to the first base station 411 may be manage respective cells constituting the first cluster 401.

In the CBF-based cellular communication system, a first terminal 431 may be connected to a first DAU 421, and $N_t$ antennas equipped in the first DAU 421 may be activated for beamforming to the first terminal 431. Also, a second terminal 432 may be connected to a second DAU 422, and $N_t$ antennas equipped in the second DAU 422 may be activated for beamforming to the second terminal 432.

In the DBF-based cellular communication system, the first terminal 431 may be connected to the first DAU 421, the second DAU 322, a third DAU 423, and a fourth DAU 424, and antennas equipped in each of the plurality of DAUs 421, 422, 423, and 424 may be activated for beamforming to the first terminal 431. Also, the second terminal 432 may be connected to the second DAU 422, the fourth DAU 424, a fifth DAU 425, and a sixth DAU 426, and antennas equipped in each of the plurality of DAUs 422, 424, 425, and 426 may be activated for beamforming to the second terminal 432.

Meanwhile, in the CBF-based cellular communication system or the DBF-based cellular communication system, a signal received by a specific terminal may be represented as a below equation 1.

$$r = s \sum_{l=1}^{N_t} \omega_l h_l + n \quad \text{[Equation 1]}$$

Here, r may mean a signal received at the specific terminal, and a transmit signal s may be common for $N_t$ antennas having a summed energy $E_s$. $h_l$ may mean a complex Gaussian channel gain (CGCA) from a l-th antenna in activated state, n may mean an additive white Gaussian noise (AWGN) having a mean of 0 and a variance of $\sigma_n^2 = N_0/2$. An optimal beamforming weighting element $w_l$ for the l-th antenna may maximize a reception signal to noise ratio (SNR), and be defined as a below equation 2.

$$\omega_l = \frac{h_l^*}{\sqrt{\sum_{k=1}^{N_t} |h_k|^2}} \quad \text{[Equation 2]}$$

Here, $(\bullet)^*$ may mean a conjugate of $\bullet$.

The difference between CBF and DBF may be represented in a channel covariance matrix C defined as $E[(h-E[h])(h-E[h])^\dagger]$. Here, h may mean a channel fading coefficient vector $[h_1, h_2, \ldots, h_{N_t}]$, and $\dagger$ may mean a hermitian transpose operation. In the CBF-based cellular communication system, channel fading coefficients $h_1, h_2, \ldots, h_{N_t}$ may be correlated to each other. Therefore, the channel covariance matrix C may be defined as a toeplitz matrix in a below equation 3.

$$C_{CBF} = g_1 \begin{pmatrix} 1 & \rho_{1,2} & \cdots & \rho_{1,N_t} \\ \rho_{1,2}^* & 1 & \cdots & \rho_{2,N_t} \\ \vdots & \vdots & \ddots & \vdots \\ \rho_{1,N_t}^* & \rho_{2,N_t}^* & \cdots & 1 \end{pmatrix} \quad \text{[Equation 3]}$$

Here, $\rho_{k,l}$ may mean a spatial correlation between a k-th antenna and a l-th antenna. On the contrary, in the DBF-based cellular communication system, since $N_t$ antennas experience an uncorrelated fading channel, the channel covariance matrix may be defined as a below equation 4.

$$C_{DBF} = \begin{pmatrix} g_1 & 0 & \cdots & 0 \\ 0 & g_2 & \cdots & 0 \\ \vdots & \vdots & \ddots & \vdots \\ 0 & 0 & \cdots & g_{N_t} \end{pmatrix} \quad \text{[Equation 4]}$$

Meanwhile, a bit error ratio (BER) for the optimal beamforming weighting element of the equation 2 may be defined as a below equation 5.

$$P_b = p \sum_{l=1}^{N_t} \varphi_l \left[ 1 - \sqrt{\frac{\lambda_l q \gamma}{1 + \lambda_l q \gamma}} \right] \quad \text{[Equation 5]}$$

Here, SNR may be defined as $$\gamma = \frac{E_S}{N_0}, \quad \varphi_l \triangleq \prod_{i \neq l} \left( \frac{\lambda_l}{\lambda_l - \lambda_i} \right),$$

and an eigenvalue of the channel covariance matrix C may be defined as $\lambda_l \triangleq 1_{th}$. Two constant parameters p and q may vary according to a modulation manner. For example, when a binary phase shift keying (BPSK) is used, $p=\frac{1}{2}$, and $q=1$.

The eigenvalue of $C_{CB1}$ Ar may be calculated as $g_1(1-\rho)$ or $g_1(1+\rho)$ according to that $\det[C_{CBF} - \lambda_l^{CBF} I]$ is 0. Here, I may mean an identity matrix, det[X] may mean a determinant of a matrix X, ρ may mean a SCC between two antennas. When two antennas are used for beamforming, the eigenvalue of $C_{DFB}$ $\lambda_1^{DBF}$ may be given as $g_1$ or $g_2$. If the eigenvalue of the $C_{CBF}$ is inputted to the equation 5, $P_b^{CBF}$ may be obtained. If the eigenvalue of the $C_{DBF}$ is inputted to the equation 5, $P_b^{DBF}$ may be obtained.

Figure 6:
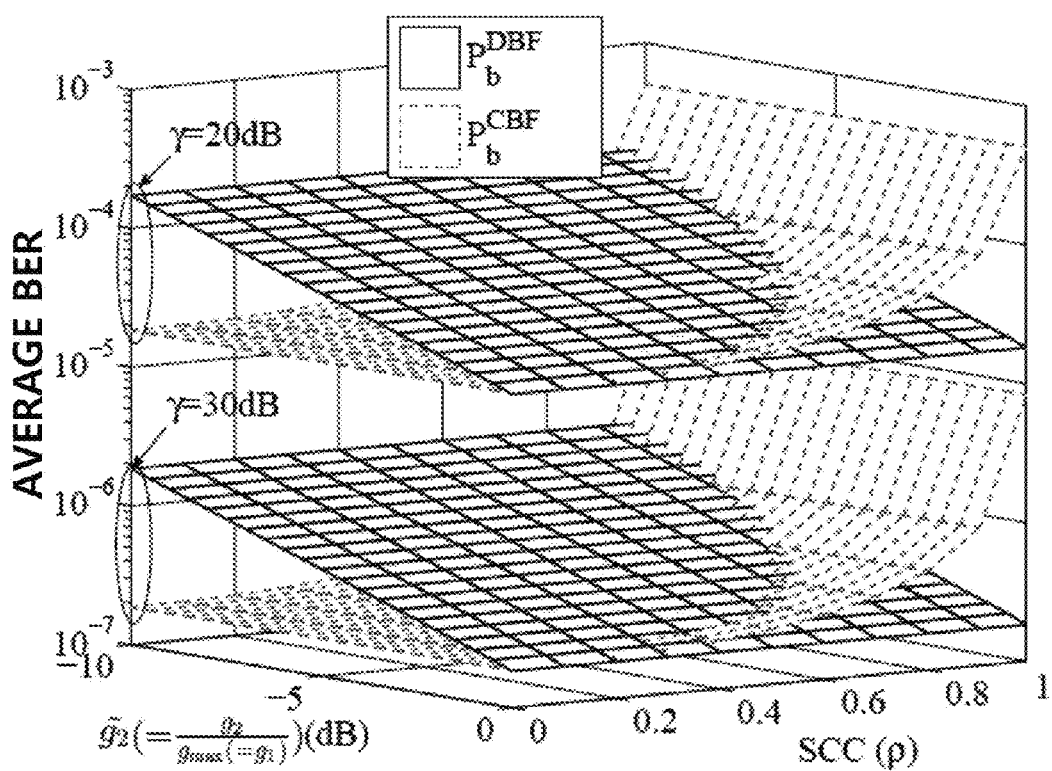
FIG. 6 is a graph illustrating a comparison between BERs of CBF and DBF according to SCC in CBF and MCG in DBF.

FIG. 6 is a graph illustrating a comparison between BERs of CBF and DBF according to SCC in CBF and MCG in DBF.

Referring to FIG. 6, the number of antenna ($N_t$) is 2, the SNR (γ) is 20 dB or 30 dB, and a MCG ratio of DBF ($\tilde{g}_2$) is $$\frac{g_{2l}}{g_{max}(=g_1)}.$$

In a case that a SCC (ρ) exceeds a predetermined threshold, the performance of CBF may decrease as compared to the performance of DBF. On the contrary, in a case that the SCC is less than the predetermined threshold, the performance of DBF may decrease as compared to that of CBF. As the MCG ratio of DBF ($\tilde{g}_2$) comes close to 1, the predetermined threshold may decrease.

Hereinafter, a dual mode beamforming method according to an exemplary embodiment of the present disclosure will be explained.

Figure 7:
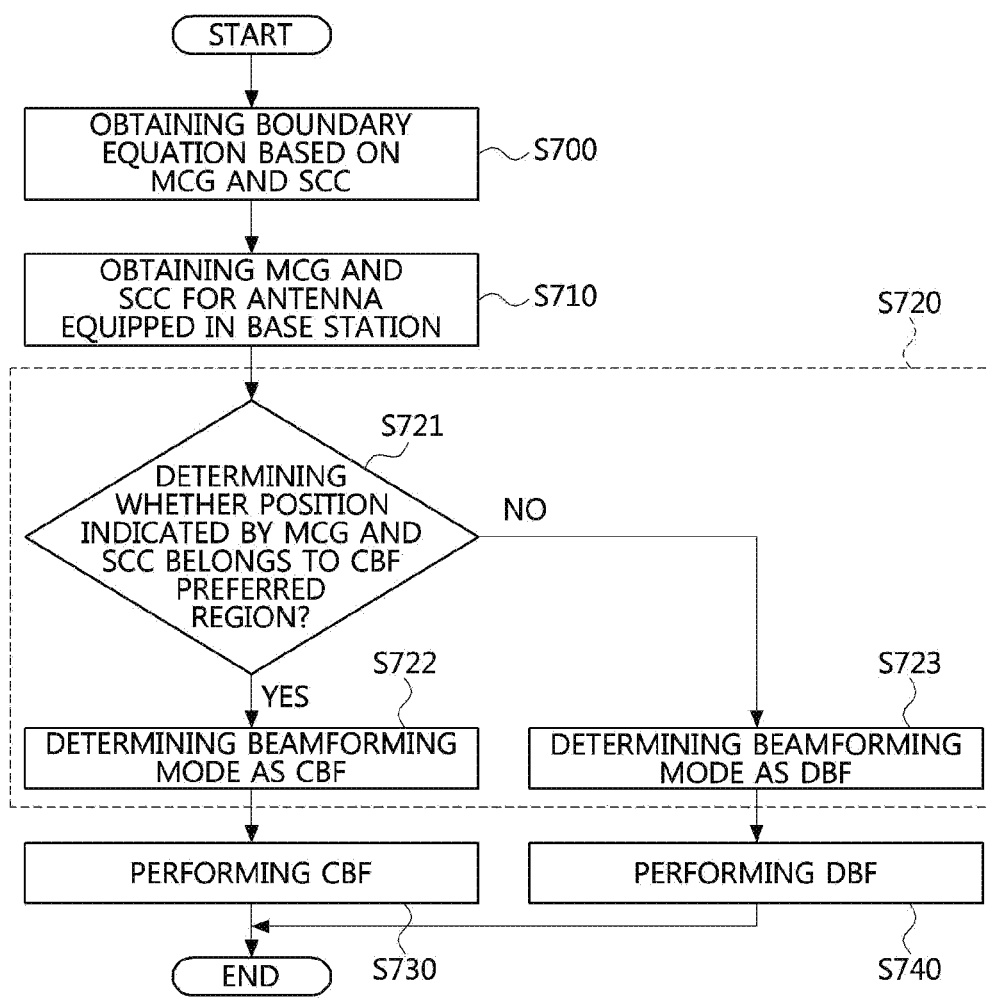
FIG. 7 is a flow chart illustrating a dual mode beamforming method according to an exemplary embodiment of the present disclosure.

FIG. 7 is a flow chart illustrating a dual mode beamforming method according to an exemplary embodiment of the present disclosure.

Referring to FIG. 7, a terminal may obtain a boundary equation generated based on MCGs and SCCs for a plurality of antennas of a plurality of base stations (S700). The terminal may directly generate the boundary equation based on the MCGs and SCCs, or obtain the boundary equation from at least one base station among the plurality of base stations.

In the following description, a method of generating the boundary equation will be explained in detail.

The boundary equation may represent switching points where the beamforming mode changes from CBF to DBF (or, switching points where the beamforming mode changes from DBF to CBF). For example, in FIG. 6 which compares BERs of CBF and DBF, points where $P_b^{CBF}$ is identical to $P_b^{DBF}$ may be represented by using the boundary equation.

Meanwhile, an asymptotic version of the equation 5 for high SNR may be defined as a below equation 6.

$$P_b \approx \frac{A}{\gamma^{N_t}} \quad \text{[Equation 6]}$$

Here, A may mean a beamforming array gain, and A may be defined as a below equation 7.

$$A = \frac{\prod_{m=1}^{N_t}\left(m - \frac{1}{2}\right)}{2N_t!\det[C]} \quad \text{[Equation 7]}$$

Here, C may mean a channel covariance matrix for beamforming.

Accordingly, the boundary equation may be summarized as $\det[C_{CBF}]=\det[C_{DBF}]$. An exponential channel covariance matrix for CBF may be defined as a below equation 8.

$$C_{CBF} = g_1\begin{pmatrix} 1 & \rho & \cdots & \rho^{N_t-1} \\ \rho & 1 & \cdots & \rho^{N_t-2} \\ \vdots & \vdots & \ddots & \vdots \\ \rho^{N_t-1} & \rho^{N_t-2} & \cdots & 1 \end{pmatrix} \quad \text{[Equation 8]}$$

Here, ρ may mean a spatial correlation coefficient between adjacent antennas. Through a lower upper (LU) factorization of the equation 8, a below equation 9 may be obtained.

$$C_{CBF} = g_1\begin{pmatrix} 1 & \rho & \cdots & 0 \\ \rho & 1 & \cdots & 0 \\ \vdots & \vdots & \ddots & \vdots \\ \rho^{N_t-1} & \rho^{N_t-2} & \cdots & 1 \end{pmatrix} \times \quad \text{[Equation 9]}$$

$$\begin{pmatrix} 1 & \rho & \rho^2 & \cdots & \rho^{N_t-1} \\ 0 & 1-\rho^2 & (1-\rho^2)\rho & \cdots & (1-\rho^2)\rho^{N_t-2} \\ 0 & 0 & 1-\rho^2 & \cdots & (1-\rho^2)\rho^{N_t-3} \\ \vdots & \vdots & \vdots & \ddots & \vdots \\ 0 & 0 & 0 & \cdots & 1-\rho^2 \end{pmatrix}$$

Here, in the right side of the equation 9, a below equation 10 may be obtained by multiplying diagonal elements of the upper triangular matrix and scaling terms ($g_1^{N_t}$).

$$\det[C_{CBF}]=g_1^{N_t}(1-\rho^2)^{N_t-1} \quad \text{[Equation 10]}$$

Meanwhile, $\det[C_{DBF}]$ may be defined as a below equation 11.

$$\det[C_{DBF}] = \prod_{l=1}^{N_t} g_l \quad \text{[Equation 11]}$$

When the equation 10 and the equation 11 are respectively inputted to $\det[C_{CBF}]=\det[C_{DBF}]$, the boundary equation may be defined as a below equation 12.

$$\prod_{l=1}^{N_t} g_l = g_1^{N_t}(1-\rho^2)^{N_t-1} \quad \text{[Equation 12]}$$

The equation 12 may be represent as a below equation 13.

$$\rho_{cut\ off} = \sqrt{1 - \left(\prod_{l=2}^{N_t}\tilde{g}_l\right)^{\frac{1}{N_t-1}}} \quad \text{[Equation 13]}$$

Here, $$\tilde{g}_l\left(=\frac{g_l}{g_{max}(=g_1)}\right)$$

may mean a MCG ratio between a base station having the largest MCG and a l-th base station. Thus, when $\tilde{g}_1 = 1$ and $\forall l \neq 1$, $\tilde{g}_l < 1$. Also, $\rho_{cutoff}$ may mean a threshold. When the MCG ratio exceeds the threshold, the performance of CBF may decrease as compared to the performance of DBF. When the MCG ratio is less than the threshold, the performance of DBF may decrease as compared to the performance of CBF.

The above-described exponential correlation model of the equation 9 may be suitable to 1-dimensional antenna array. However, it may not be suitable to other antenna array structures. For example, the exponential correlation model may not be suitable to a 2-dimensional antenna array ($N_t=3$) or a 3-dimensional antenna array ($N_t=4$) in which distances between antenna are identical. The channel covariance matrix for multi-dimensional antenna arrays may be defined as a below equation 14.

$$C_{CBF} = g_1 \begin{pmatrix} 1 & \rho & \rho & \cdots & \rho \\ \rho & 1 & \rho & \cdots & \rho \\ \vdots & \vdots & \vdots & \ddots & \vdots \\ \rho & \rho & \rho & \cdots & 1 \end{pmatrix}_{N_t \times N_t}$$ [Equation 14]

A determinant of such the constant correlation covariance matrix may be defined as a below equation 15.

$$\det[C_{CBF}] = g_1^{N_t}(1-\rho)^{N_t-1}(1+(N_t-1)\rho)$$ [Equation 15]

When the equation 11 and the equation 15 are respectively substituted in $\det[C_{CBF}] = \det[C_{DBF}]$, the boundary equation for the constant correlation covariance matrix may be defined as a below equation 16.

$$\prod_{l=1}^{N_t} \tilde{g}_l = (1-\rho)^{N_t-1}(1+(N_t-1)\rho)$$ [Equation 16]

The above-described boundary equation may be represented as a graph.

Figure 8:
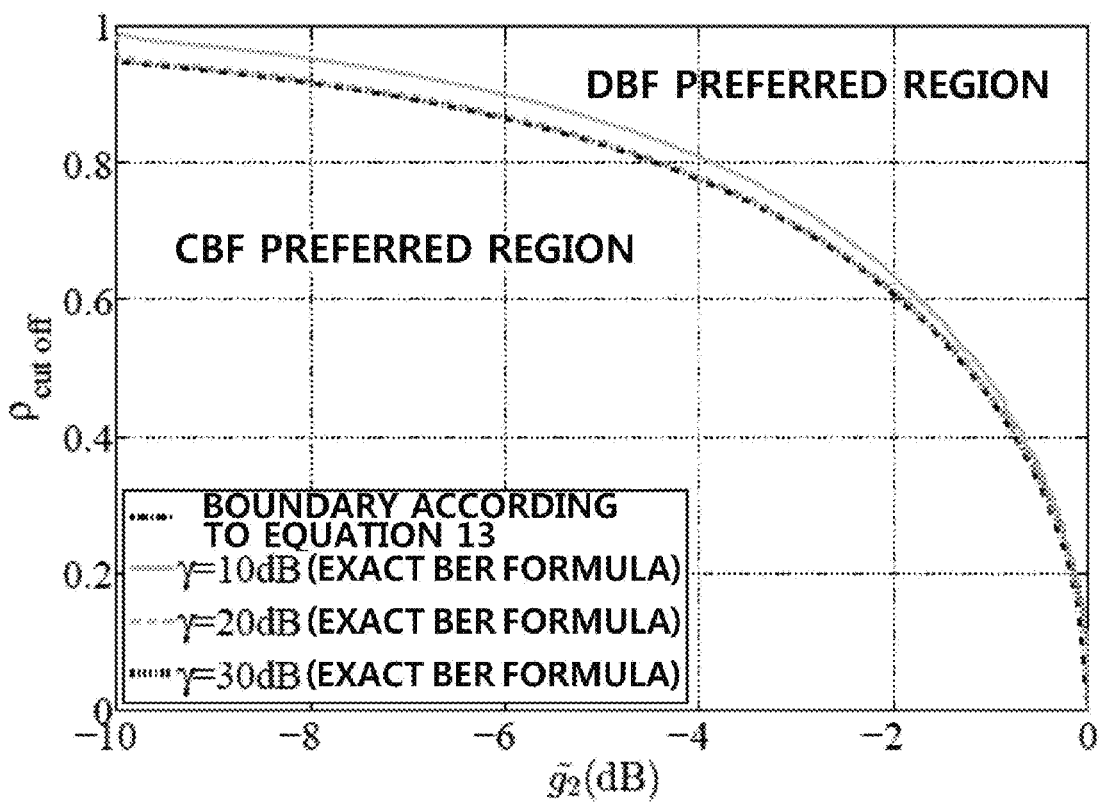
FIG. 8 is a graph illustrating a boundary equation when $N_t$ is 2.
Figure 9:
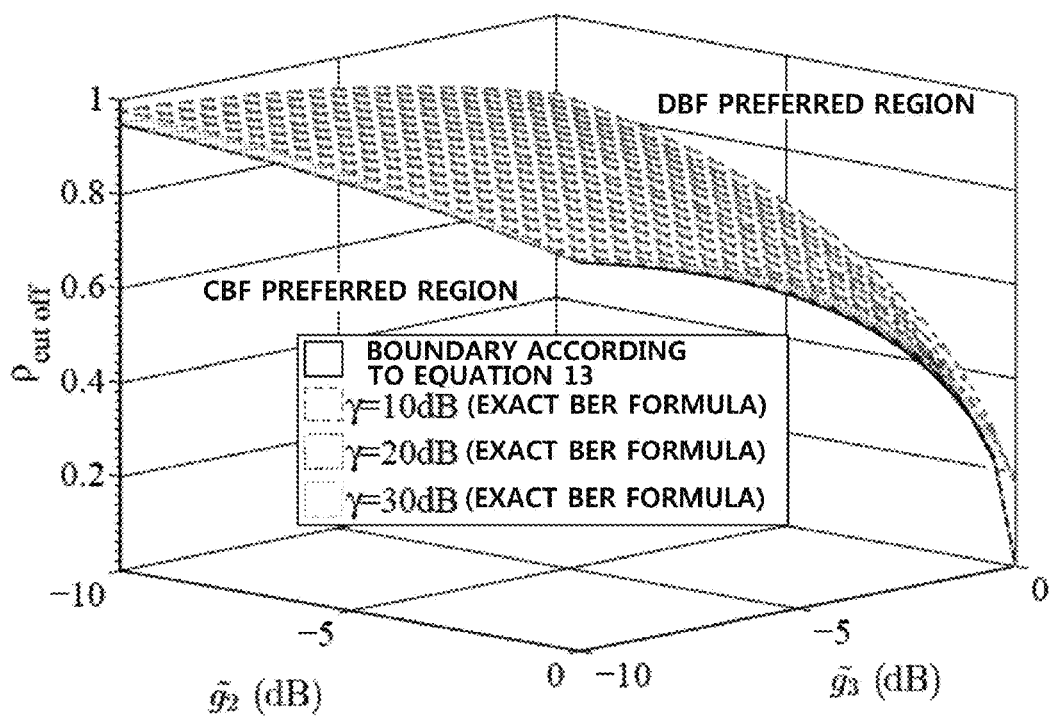
FIG. 9 is a graph illustrating a boundary equation when $N_t$ is 3.

FIG. 8 is a graph illustrating a boundary equation when $N_t$ is 2, and FIG. 9 is a graph illustrating a boundary equation when $N_t$ is 3.

Referring to FIG. 8 and FIG. 9, as MCG ratios (i.e., $\tilde{g}_2$, $\tilde{g}_3$) come close to 1 (=0 dB), $\rho_{cutoff}$ may decrease. As $\rho_{cutoff}$ decreases, a region where CBF is preferred (hereinafter, referred to as 'CBF preferred region') may increase. As the MCG ratio increases, a region where DBF is preferred (hereinafter, referred to as 'DBF preferred region') may increase. When $N_t$ is 2, the correlation matrix for the exponential correlation model is almost identical to the correlation matrix for the constant correlation model. Although the boundary equation (i.e., according to the equation 13) is based on an asymptotic BER formula which is valid only in high SNR regions, it has good performances also for a wide range of SNR (i.e., from low SNR region to high SNR region). That is, a difference between the boundary equation and the exact BER formula is not so significant.

When the equation 12 and the equation 16 are represented in a dB scale, the boundary equation may be defined as a below equation 17.

$$\sum_{l=1}^{N_t} \tilde{g}_l (\text{in dB}) =$$ [Equation 17]

-continued $$\sum_{l=2}^{N_t} \tilde{g}_l(\text{in dB}) = \begin{cases} 10\log_{10}(1-\rho^2)^{N_t-1}, \\ \text{for exponential correlation model} \\ 10\log_{10}(1-\rho)^{N_t-1}(1+(N_t-1)\rho), \\ \text{for constant correlation model} \end{cases}$$

Here, $\tilde{g}_1 = 1$ (=0 dB). When $N_t$ is 3, the equation 17 may be identical to a two-dimensional plane of ($\tilde{g}_2, \tilde{g}_3$), identically to a below equation 18.

$$\tilde{g}_2(\text{in dB}) + \tilde{g}_3(\text{in dB}) = \begin{cases} 10\log_{10}(1-\rho^2)^2, \\ \text{for exponential correlation model} \\ 10\log_{10}(2\rho^3 + 3\rho^2 + 1), \\ \text{for constant correlation model} \end{cases}$$ [Equation 18]

Figure 10:
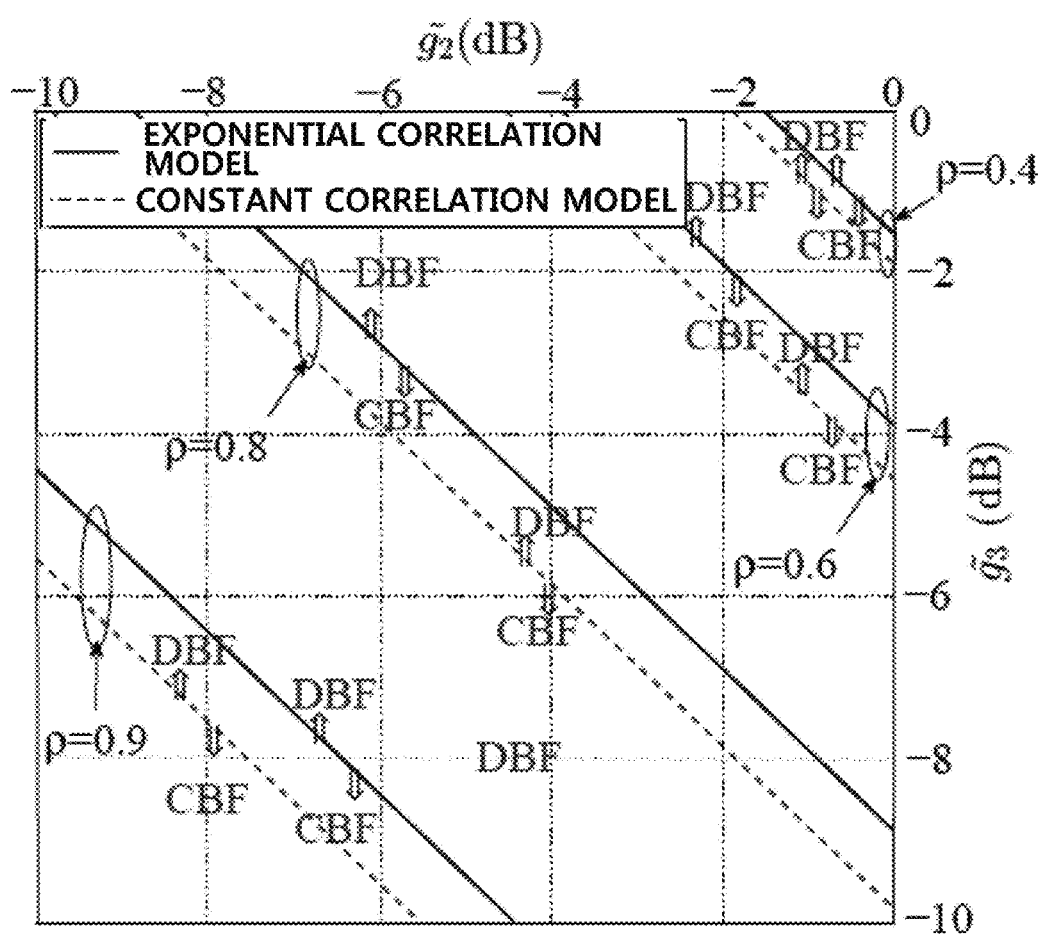
FIG. 10 is a graph illustrating boundaries of CBF preferred regions and DBF preferred regions according to correlation models when $N_t$ is 3.

FIG. 10 is a graph illustrating boundaries of CBF preferred regions and DBF preferred regions according to correlation models when $N_t$ is 3.

Referring to FIG. 10, boundaries for the DBF preferred region and CBF preferred regions, in a plane of ($\tilde{g}_2, \tilde{g}_3$) for a case that $N_t$ is 3, are illustrated with respect to the exponential correlation model and the constant correlation model. As $\rho$ increases, the DBF preferred region may expand to the left lower side of the ($\tilde{g}_2, \tilde{g}_3$) plane. In the constant correlation model, correlations between antennas may be $\rho$ identically. On the contrary, in the exponential correlation model, correlations between antennas may be $\rho^2$, $\rho^3$, .... The CBF array gain for the constant correlation model may be smaller than that of the exponential correlation model. Thus, the DBF preferred region in the constant correlation model may be further expanded to the left lower side as compared to the DBF preferred region in the exponential correlation model.

After the terminal obtains the boundary equation in the above-described manner, the terminal may obtain, from a plurality of base stations, MCGs of respective antennas equipped in the plurality of base stations and SCCs of a plurality of antennas equipped in at lease one base station among the plurality of base stations (S710). Here, the terminal may obtain at least one of the MCGs and the SCCs by periodically or aperiodically monitoring signals transmitted by the plurality of base stations. Here, the plurality of base stations may be located in communicatable positions with the terminal.

The terminal may obtain the MCGs based on signals received from the plurality of base stations. For example, the terminal may obtain a MCG for a specific antenna equipped in the first base station based on signals received from the first base station, and obtain a MCS for a specific antenna equipped in the second base station based on signals received from the second base station. Here, the terminal may obtain the MCGs from the received signals by using known methods.

Also, the terminal may obtain a SCC between multiple antennas equipped in a base station from the base station. That is, a base station may notify a SCC between multiple antennas equipped in it to other communication entities (for example, other base stations, terminals, etc.), periodically or aperiodically. Through this, the terminal may obtain the SCC between multiple antennas from the base station.

The terminal may determine a beamforming mode based on the boundary equation, the MCGs, the SCCs obtained from the plurality of base stations (S720). Specifically, the terminal may determine whether respective positions indicated by the MCGs and SCCs belong to the CBF preferred region in the space (i.e., FIG. 8 and FIG. 9) represented by the boundary equation (S721). On the contrary, the terminal may determine whether respective regions indicated by the MCGs and SCCs belong to the DBF preferred region in the space represented by the boundary equation.

When the position indicated by MCG and SCC of a specific base station belongs to the CBF preferred region, the terminal may determine the beamforming mode as CBF (S722), and perform the CBF with the corresponding base station (S730). On the contrary, when the positions indicated by MCGs and SCCs of multiple base stations belong to the DBF preferred region (i.e., do not belong to the CBF preferred region), the terminal may determine the beamforming mode as DBF (S723), and perform the DBF with the multiple base stations (S740).

Also, the terminal may determine the beamforming mode by inputting the MCGs and SCCs obtained from the plurality of base stations to the boundary equation according to the equation 17. For example, when the MCGs and SCCs are inputted to the boundary equation according to the equation 17, if the left side of the boundary equation is larger than the right side of that, the terminal may determine the beamforming mode as DBF, and perform the DBF with the corresponding base stations.

On the contrary, when the MCGs and SCCs are inputted to the boundary equation according to the equation 17, if the left side of the boundary equation is smaller than the right side of that, the terminal may determine the beamforming mode as CBF, and perform the CBF with the corresponding base station.

In the following description, the above-described dual mode beamforming method will be explained with respect to feasibility.

According to the dual mode beamforming method, the terminal may switch its beamforming mode from CBF to DBF or from DBF to CBF based on the boundary equation of the equation 17. That is, if the left side ($\Sigma_{l=2}^{N_t} \tilde{g}_l$ (in dB)) of the boundary equation is larger than the right side of the boundary equation, the terminal may determine its beamforming mode as DBF. On the contrary, if the left side of the boundary equation is smaller than the right side of the boundary equation, the terminal may determine its beamforming mode as CBF. That is, the beamforming mode may be determined according to a ratio between SCC and MCG.

The dual mode beamforming method according to the equation 17 may be realized practically with respect to two aspects. First, the SCC ($\rho$) of CBF and the MCG ($g_1$, $g_2$, ..., $g_{N_t}$) of DBF change slowly as compared to instantaneous fading coefficients. Thus, the terminal may easily measure parameters (i.e., SCCs and MCGs) for the dual mode beamforming, and feedback overheads related to the parameters are negligibly small. Second, since the boundary equation according to the equation 17 is not related to SNR, the terminal may switch its beamforming mode regardless of SNR.

From the aspect of the terminal, overheads may exist when the terminal monitors MCGs of respective antennas of multiple base stations and obtains SCCs (or, determinants of $C_{CBF}$). Also, from the aspect of the base station, overheads may exist when the base station shares data of the terminal with multiple base stations. However, such the overheads are acceptable in a communication system (e.g., a cooperative communication system, a regular distributed system, etc.).

In the following description, the performance analysis results of the above-described dual mode beamforming method will be explained.

In consideration of the equation 6 and the equation 7, a SNR gain of a preferred beamforming mode, in comparison to a SNR of a non-preferred beamforming mode, may be defined as a below equation 19.

$$G(\text{in dB}) = \left|10\log_{10}\frac{\gamma_{DBF}}{\gamma_{CBF}}\right| \quad \text{[Equation 19]}$$

$$= \left|10\log_{10} \sqrt[N_t]{\frac{\det[C_{CBF}]}{\det[C_{DBF}]}}\right|$$

$$= \begin{cases} \left|\frac{10}{N_t}\log_{10}\frac{(1-\rho^2)^{N_t-1}}{\prod_{l=1}^{N_t}\tilde{g}_l}\right|, \\ \text{for exponential correlation model} \\ \left|\frac{10}{N_t}\log_{10}\frac{(1-\rho^2)^{N_t-1}(1+(N_t-1)\rho)}{\prod_{l=1}^{N_t}\tilde{g}_l}\right|, \\ \text{for constant correlation model} \end{cases}$$

Here, $\gamma_{DBF}$ may mean a required SNR of DBF for a target BER, and $\gamma_{CBF}$ may mean a required SNR of CBF for the target BER. Also, a path loss and a log-normal shadowing forming a MCG from the l-th base station to the terminal may be defined as a below equation 20.

$$g_l = \Gamma_l d_l^{-\eta} \quad \text{[Equation 20]}$$

Here, $d_l$ may mean a distance between the l-th base station and the terminal, $\eta$ may mean a path loss exponent. $\Gamma_l$ may mean a log-normal shadowing element from the l-th base station, and may be represented as $\Gamma_l = 10^{\zeta_l/10}$. Here, $\zeta_l$ may mean a Gaussian random variable, and a standard deviation of the Gaussian random variable may be identical to $\sigma_S$. Also, $g_l$ may be determined according to the position of the terminal.

Figure 11:
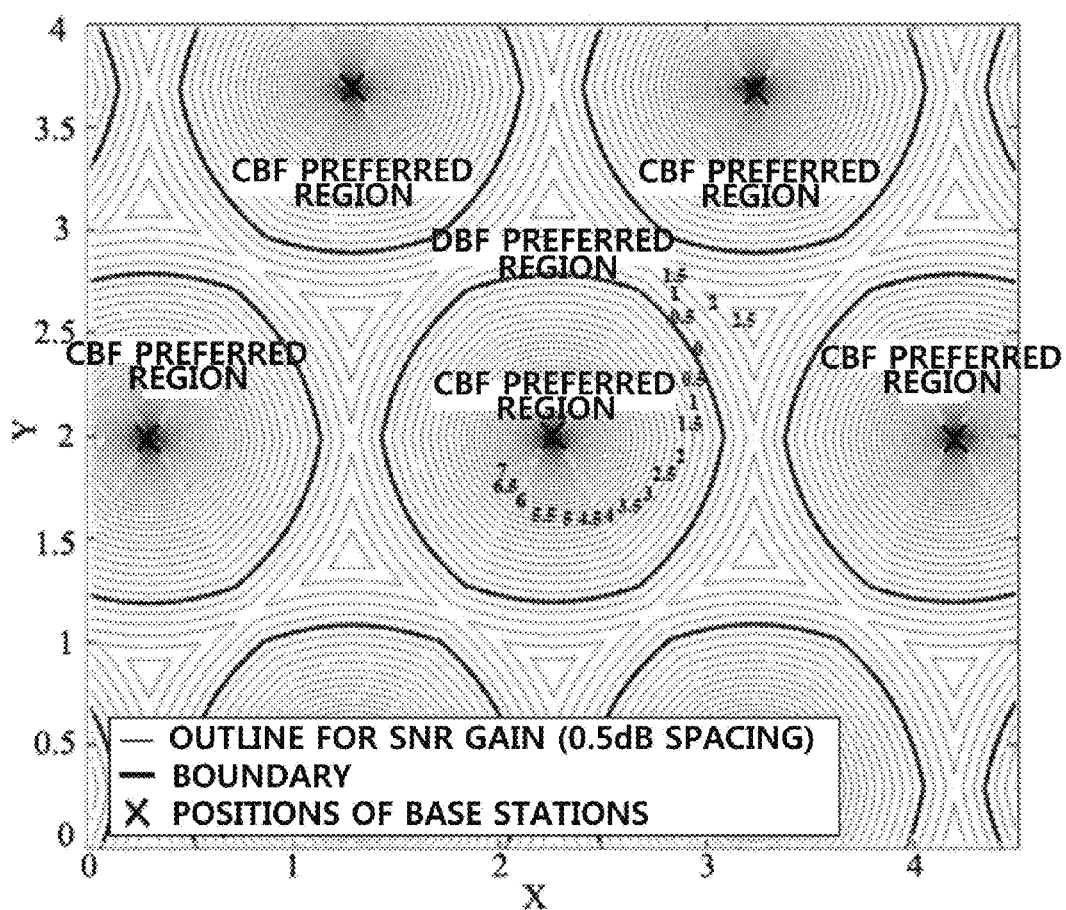
FIG. 11 is a graph illustrating a SNR gain outline for an exponential correlation model in a geographical plane when $\eta$ is 2 and $N_t$ is 3.
Figure 12:
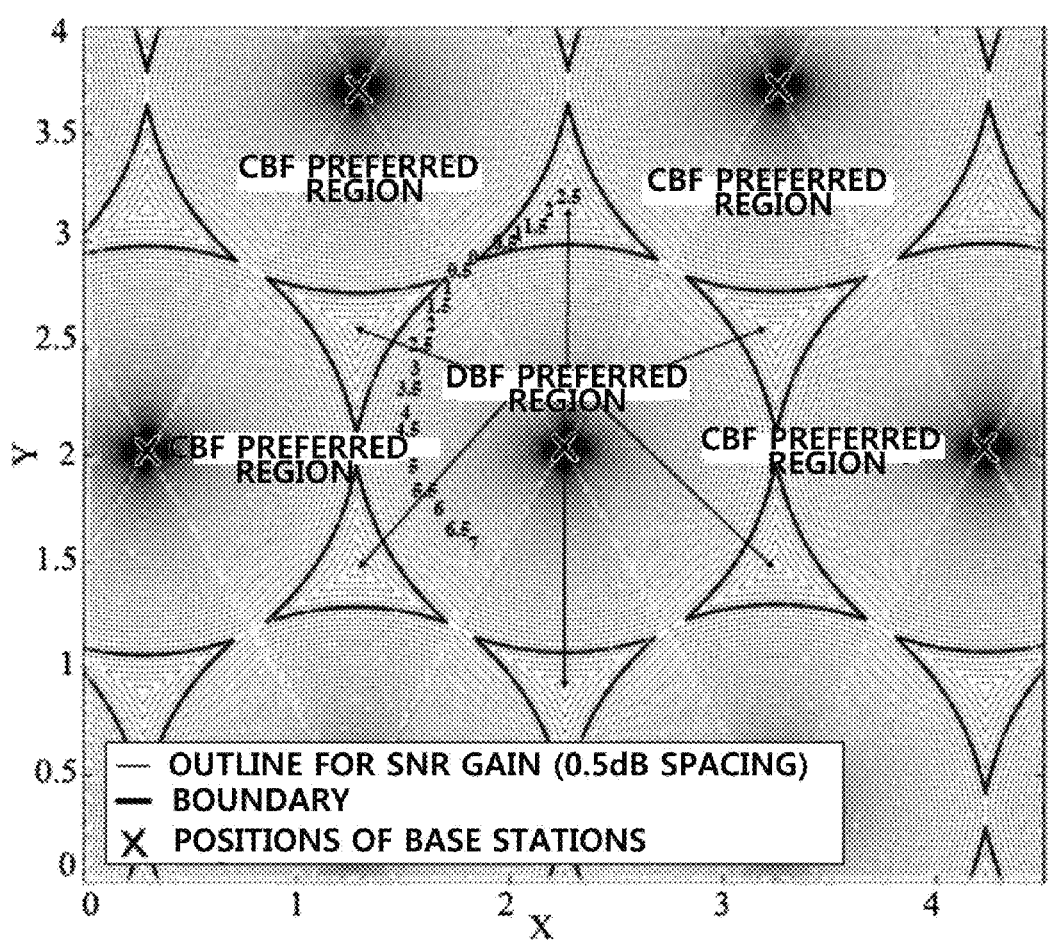
FIG. 12 is a graph illustrating a SNR gain outline for an exponential correlation model in a geographical plane when $\eta$ is 4 and $N_t$ is 3.

FIG. 11 is a graph illustrating a SNR gain outline for an exponential correlation model in a geographical plane when $\eta$ is 2 and $N_t$ is 3, and FIG. 12 is a graph illustrating a SNR gain outline for an exponential correlation model in a geographical plane when $\eta$ is 4 and $N_t$ is 3. Here, it may be assumed that the cluster size $N_c$ is sufficiently larger than 7, and the boundary of the cluster may exceed the ranges illustrated in FIG. 11 and FIG. 12.

Referring to FIG. 11 and FIG. 12, outline patterns in a triangle unit formed among three adjacent base stations may repeat identically. The performance gain of CBF to DBF may increase around the base station, and the performance gain of DBF to CBF may increase in a center of the triangle unit. The performance gain of DBF to CBF in the center of the triangle unit may be smaller than the performance gain of CBF to DBF around the base station.

The outline representing the SNR gain of 0 dB may correspond to an outline according to the equation 12. Accordingly, in the outline representing the SNR gain of 0 dB, the beamforming mode may change from CBF to DBF or from DBF to CBF. The outline whose SNR gain is 0 may correspond to a cell radius having an appropriate scaling factor proportional to the cell radius. The reason is that the SNR gain G of the equation 19 is determined based on not MCG ($g_l$) but the MCG ratio $$\left(\tilde{g}_l\left(=\frac{g_l}{g_1}\right)\right)$$

which is independent from the dimension.

Figure 13:
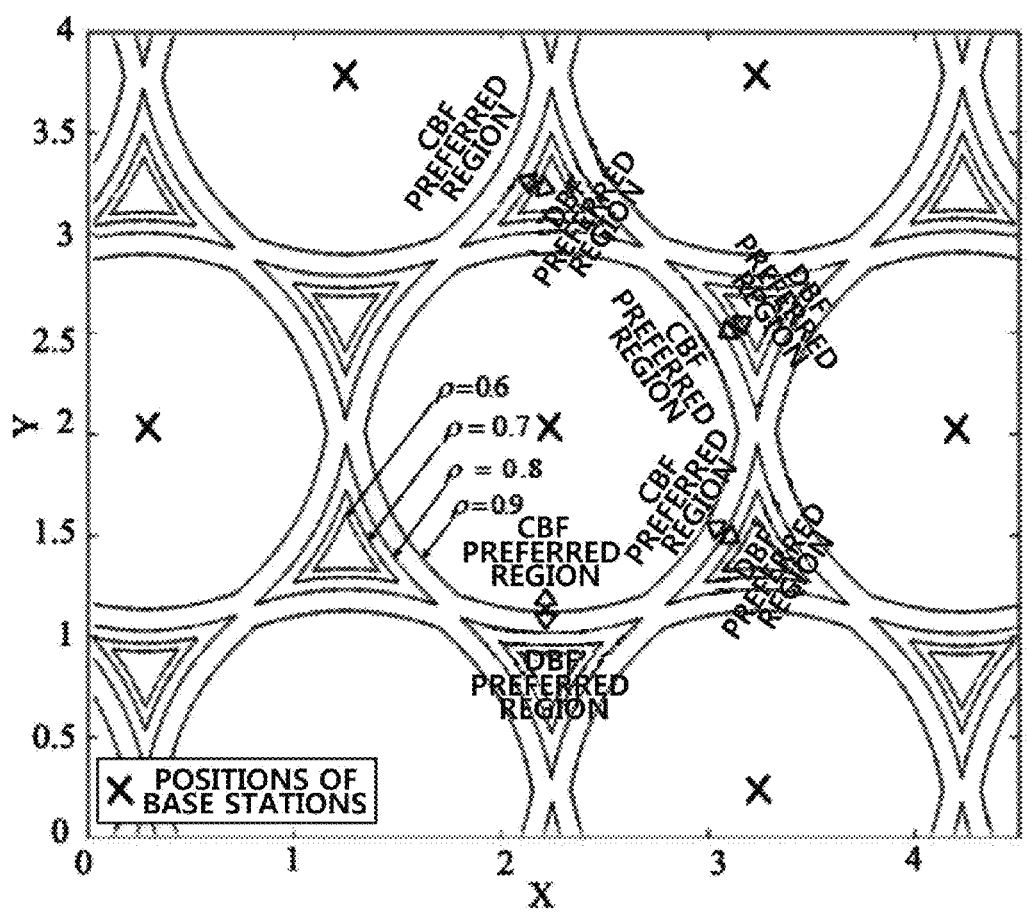
FIG. 13 is a graph illustrating an outline according to $\rho$ when $N_t$ is 3 and $\eta$ is 4.
Figure 14:
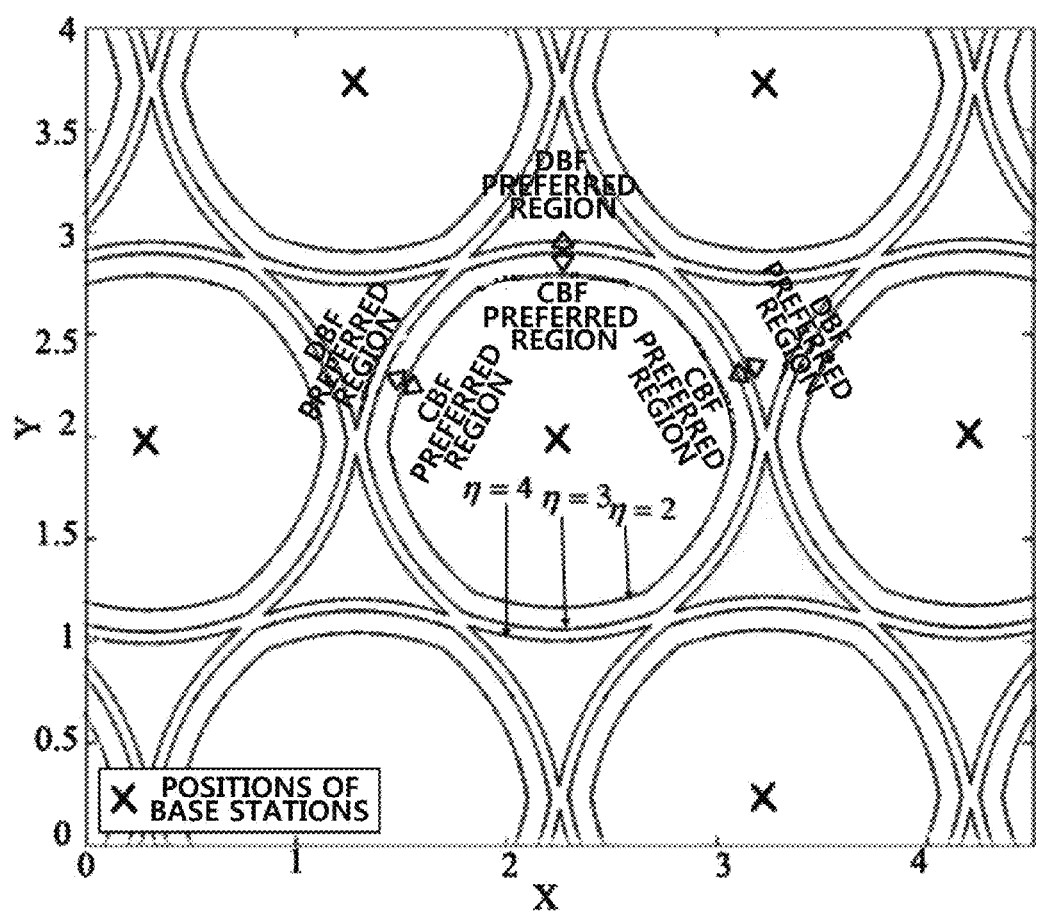
FIG. 14 is a graph illustrating an outline according to $\eta$ when $N_t$ is 3 and $\rho$ is 0.8.

FIG. 13 is a graph illustrating an outline according to ρ when $N_t$ is 3 and η is 4, and FIG. 14 is a graph illustrating an outline according to η when $N_t$ is 3 and ρ is 0.8.

Referring to FIG. 13 and FIG. 14, when η is 4, as ρ increases, the DBF preferred region may increase as compared to the CBF preferred region. On the contrary, when η is 4, as ρ decreases, the DBF preferred region may decrease as compared to the CBF preferred region. When ρ is 0.8, as η increases, the DBF preferred region may decrease as compared to the CBF preferred region. On the contrary, when ρ is 0.8, as η decreases, the DBF preferred region may increase as compared to the CBF preferred region.

Figure 15:
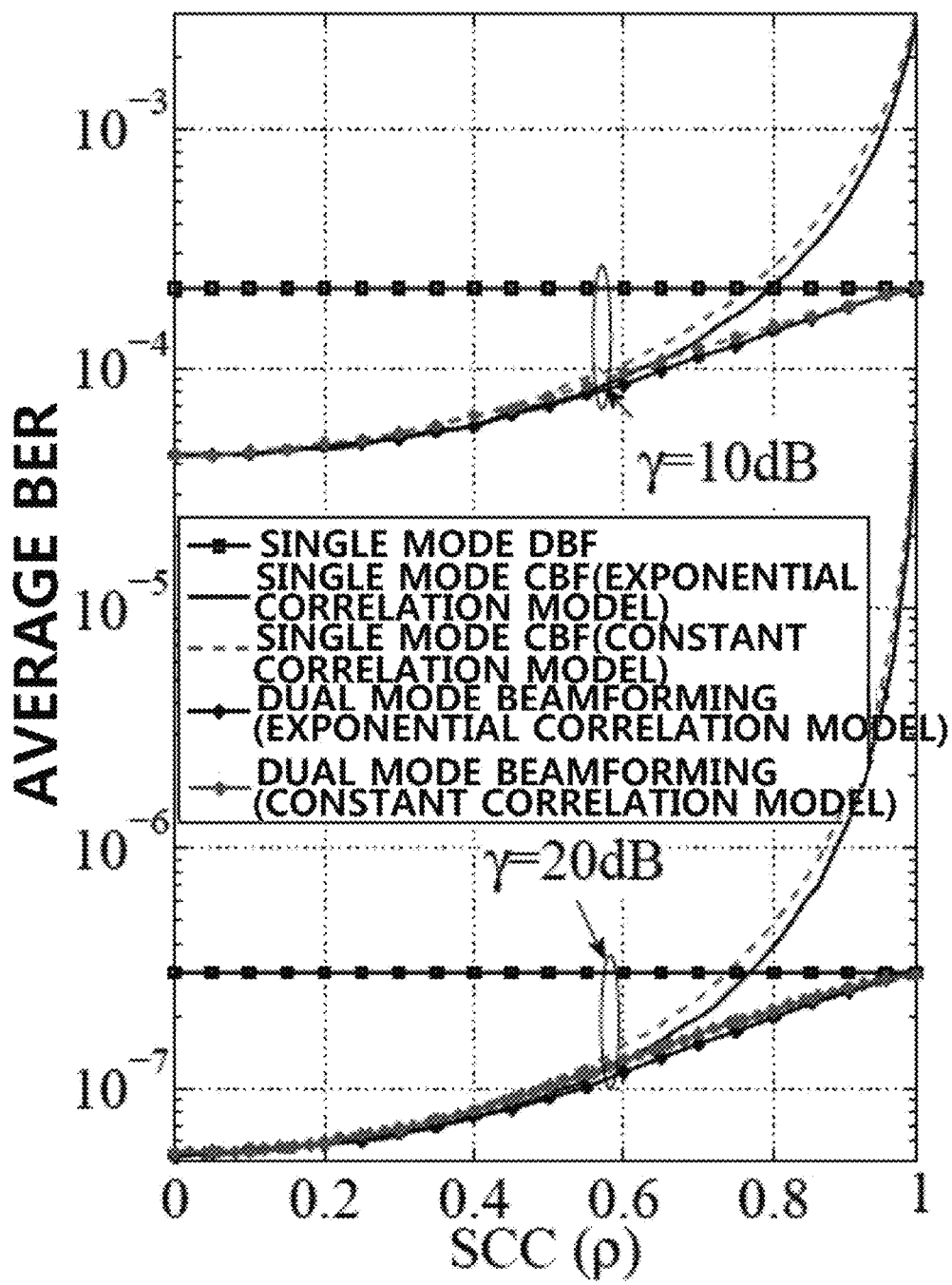
FIG. 15 is a graph illustrating an average BER according to beamforming methods when $\eta$ is 2.
Figure 16:
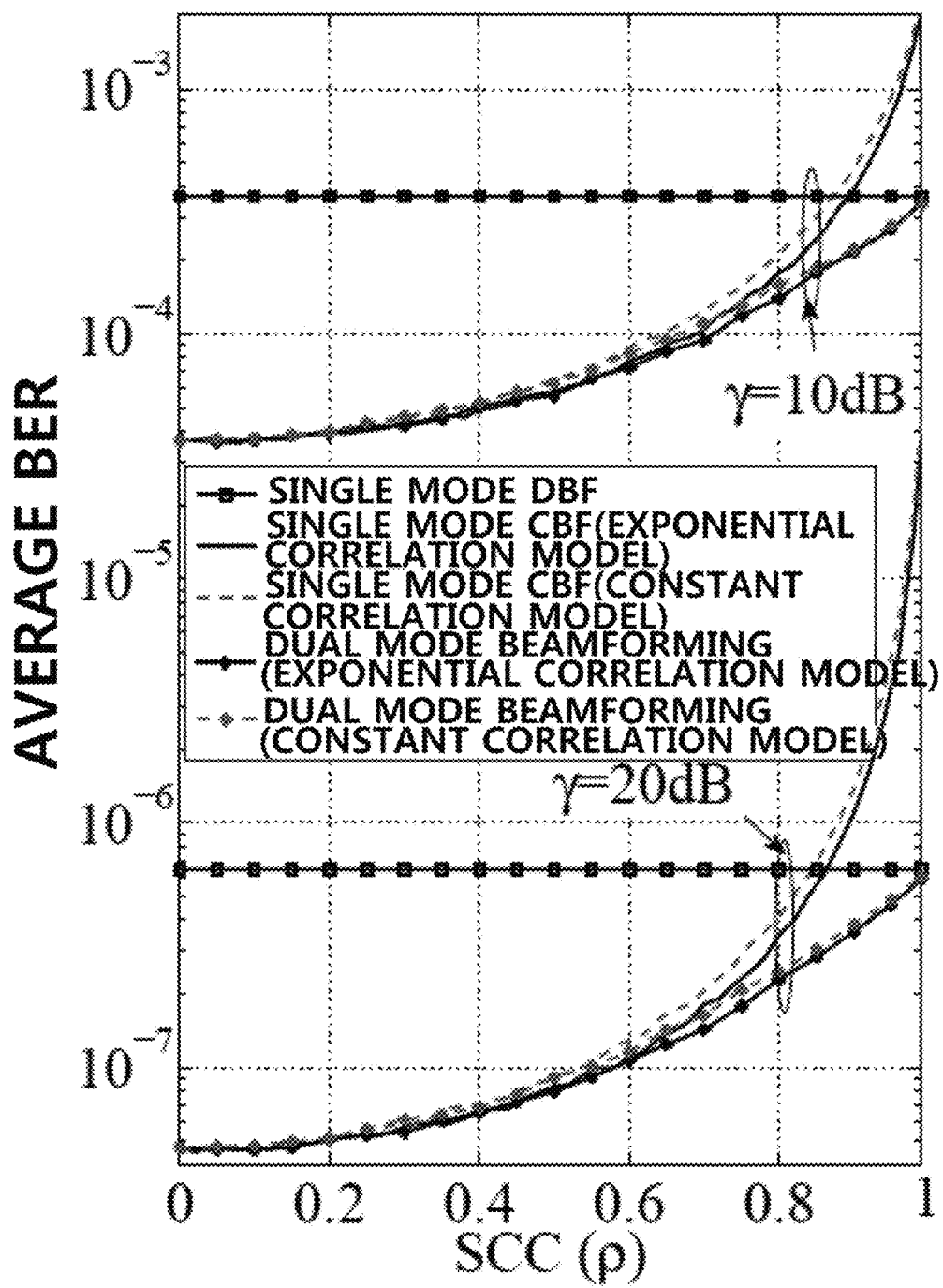
FIG. 16 is a graph illustrating an average BER according to beamforming methods when $\eta$ is 4.

FIG. 15 is a graph illustrating an average BER according to beamforming methods when η is 2, and FIG. 16 is a graph illustrating an average BER according to beamforming methods when η is 4.

Referring to FIG. 15 and FIG. 16, in most of a range of SCC (ρ), a single mode CBF shows a better performance than a single mode DBF. The single mode CBF may be used as even the best alternative solution of the dual mode beamforming according to the present disclosure. However, in a high SCC range, a performance gain of the dual mode beamforming to the single mode CBF is significant.

For example, when SCC (ρ) is larger than the threshold (approximately, 0.6), the performance gain of the dual mode beamforming to the single mode CBF may increase significantly. That is, although the DBF preferred region is smaller than the CBF preferred region, it can provide signification gain in the aspect of the average performance of whole cell to change the beamforming mode from CBF to DBF in the DBF preferred region. On the other hand, the SCC threshold (e.g., 0.6) may be used commonly regardless of the correlation model of CBF and the path loss exponent.

The difference between BER curves according to the exponential correlation model and the constant correlation model is negligible except the case of the signal mode CBF. In the single mode CBF, the performance of the constant correlation model may decrease slightly as compared to that of the exponential correlation model. The reason is that the correlation between antennas of the exponential correlation model in the equation 9 decreases as differences between antenna indexes increase although the correlation between antennas of the constant correlation model in the equation 14 decreases as differences between antenna indexes increase.

Figure 17:
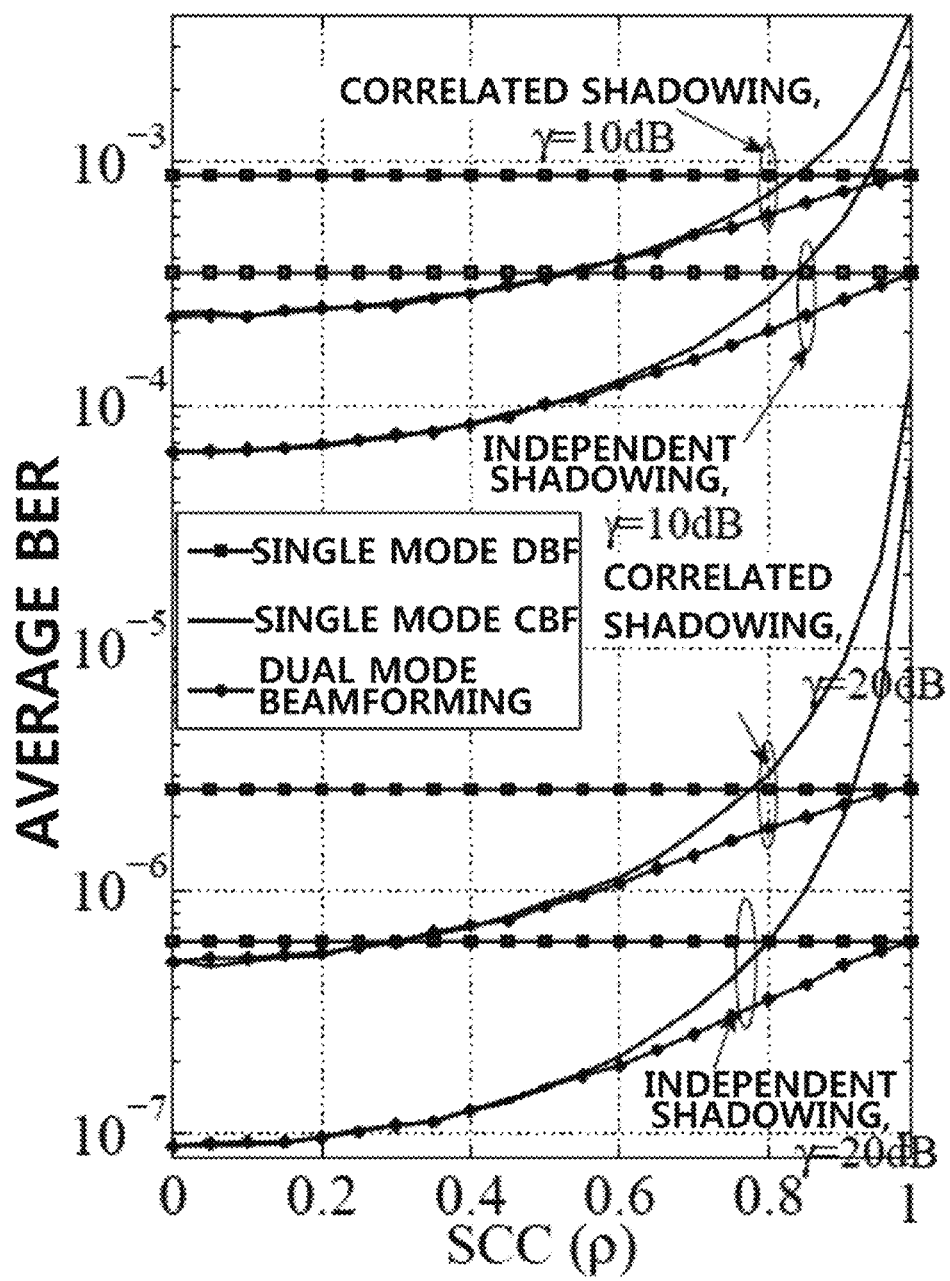
FIG. 17 is a graph illustrating an average BER according to beamforming methods when $\eta$ is 2 and a log-normal shadowing exists.
Figure 18:
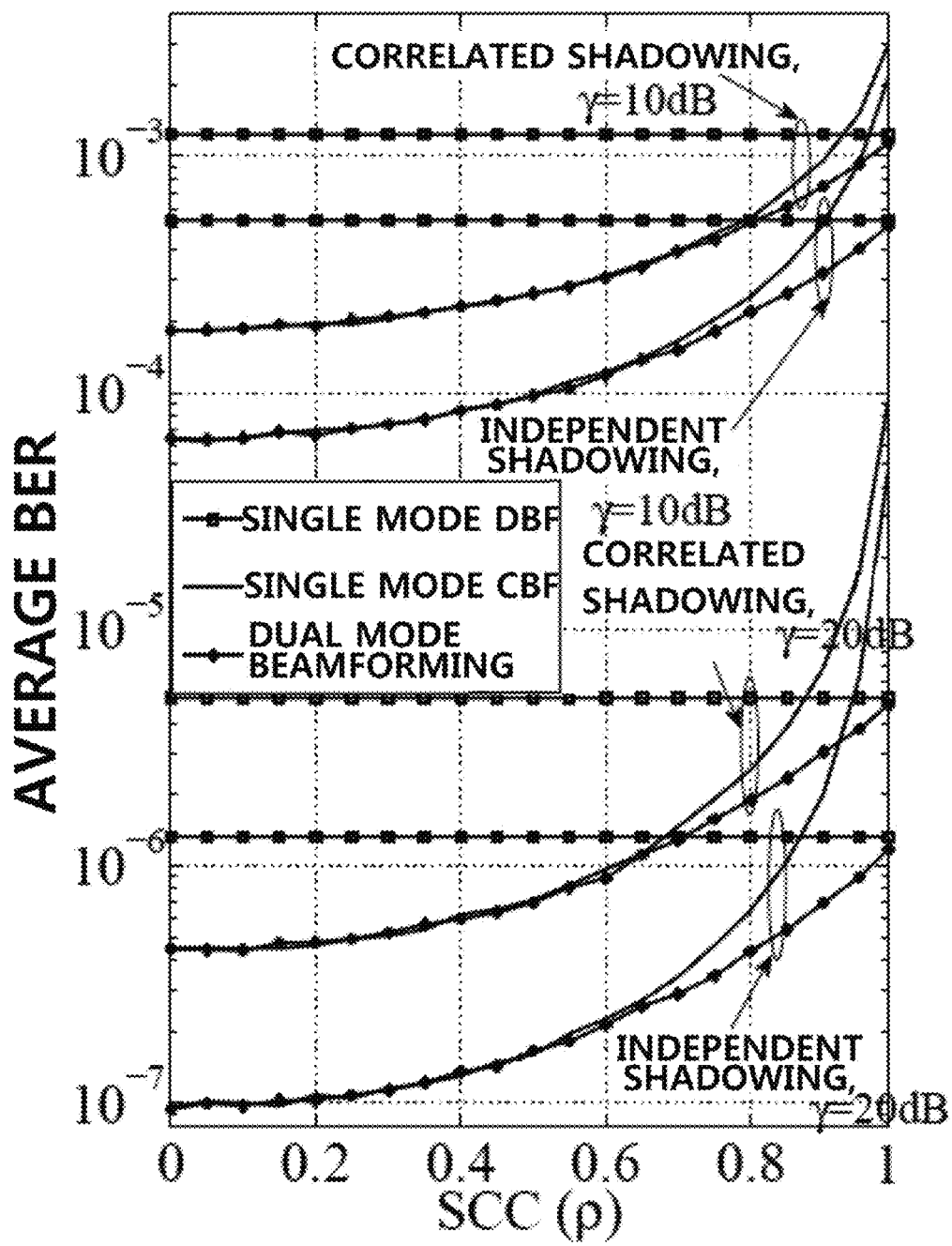
FIG. 18 is a graph illustrating an average BER according to beamforming methods when $\eta$ is 4 and a log-normal shadowing exists.

FIG. 17 is a graph illustrating an average BER according to beamforming methods when η is 2 and a log-normal shadowing exists, and FIG. 18 is a graph illustrating an average BER according to beamforming methods when η is 4 and a log-normal shadowing exists.

Referring to FIG. 17 and FIG. 18, two extreme log-normal shadowing models (e.g., a completely-correlated shadowing model ($\zeta_1 = \zeta_2 = \ldots = \zeta_{N_t}$) and an independent shadowing model (e.g., $\zeta_l$ is independent according to l)) are considered. Here, a relative BER performance according to beamforming methods in which only the path loss exists may almost identically correspond to the graphs of FIG. 15 and FIG. 16. The SCC threshold at which the dual mode beamforming shows the better performance than the single mode CBF may be 0.6 identically to the graphs of FIG. 15 and FIG. 16 in which only the path loss is considered.

On the other hand, in the shadowing, the average BER curves of the single mode CBF, the single mode DBF, and the dual mode beamforming may be moved upwards in only a y-axis due to correlations. Even in this case, the performance differences between the single mode CBF and the single mode DBF, between the single mode CBF and the dual mode beamforming, and between the single mode DBF and the dual mode beamforming may be maintained.

While the example embodiments of the present invention and their advantages have been described in detail, it should be understood that various changes, substitutions and alterations may be made herein without departing from the scope of the invention.

What is claimed is:

1. A dual mode beamforming method performed in a terminal, the method comprising:
   obtaining a boundary equation generated based on mean channel gains (MCGs) and spatial correlation coefficients (SCCs) for a plurality of antennas of a plurality of base stations;
   obtaining, from the plurality of base stations, MCGs of respective antennas equipped in each of the plurality of base stations and a SCC of a plurality of antennas equipped in at least one base station of the plurality of base stations; and
   determining a beamforming mode based on the boundary equation, the MCGs and SCCs obtained from the plurality of base stations.

2. The method according to claim 1, wherein the boundary equation represents a region in which a co-located beamforming (CBF) is preferred and a region in which a distributed beamforming (DBF) is preferred.

3. The method according to claim 1, wherein the beamforming mode is determined to be a CBF when a region indicated by the obtained MCGs and SCCs is a region in which the CBF is preferred among regions represented by the boundary equation.

4. The method according to claim 1, wherein the beamforming mode is determined to be a DBF when a region indicated by the obtained MCGs and SCCs is a region in which the DFB is preferred among regions represented by the boundary equation.

5. The method according to claim 1, wherein a SCC used for generating the boundary equation is a SCC according to an exponential correlation model or a SCC according to a constant correlation model.

6. The method according to claim 1, wherein the plurality of base stations exist in communicatable positions with the terminal.

7. A terminal apparatus performing communications, the terminal apparatus comprising a processor and a memory storing at least one program command executed by the processor, wherein the at least one program command executes:
   obtaining a boundary equation generated based on mean channel gains (MCGs) and spatial correlation coefficients (SCCs) for a plurality of antennas of a plurality of base stations;
   obtaining, from the plurality of base stations, MCGs of respective antennas equipped in each of the plurality of base stations and a SCC of a plurality of antennas equipped in at least one base station of the plurality of base stations; and determining a beamforming mode based on the boundary equation, the MCGs and SCCs obtained from the plurality of base stations.

8. The terminal apparatus according to claim 7, wherein the boundary equation represents a region in which a co-located beamforming (CBF) is preferred and a region in which a distributed beamforming (DBF) is preferred.

9. The terminal apparatus according to claim 7, wherein the beamforming mode is determined to be a CBF when a region indicated by the obtained MCGs and SCCs is a region in which the CBF is preferred among regions represented by the boundary equation.

10. The terminal apparatus according to claim 7, wherein the beamforming mode is determined to be a CBF when a region indicated by the obtained MCGs and SCCs is a region in which the CBF is preferred among regions represented by the boundary equation.

11. The terminal apparatus according to claim 7, wherein a SCC used for generating the boundary equation is a SCC according to an exponential correlation model or a SCC according to a constant correlation model.

12. The terminal apparatus according to claim 7, wherein the plurality of base stations exist in communicatable positions with the terminal.

* * * * *